United States Patent
Kain

(10) Patent No.: US 6,550,862 B2
(45) Date of Patent: Apr. 22, 2003

(54) JUVENILE VEHICLE SEAT CUP HOLDER

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/881,503

(22) Filed: Jun. 14, 2001

(65) Prior Publication Data

US 2002/0190547 A1 Dec. 19, 2002

(51) Int. Cl.[7] .................................................. A47C 1/08
(52) U.S. Cl. ........................... 297/250.1; 297/188.11; 297/188.21
(58) Field of Search ....................... 297/188.01, 188.11, 297/188.21, 250.1, 252; 224/275

(56) References Cited

U.S. PATENT DOCUMENTS

| | | | |
|---|---|---|---|
| 2,653,680 A | * | 4/1953 | Zentmire |
| 3,637,184 A | * | 1/1972 | O'Brien |
| 4,434,830 A | | 3/1984 | Hoye |
| 4,527,830 A | | 7/1985 | Meyers |
| 4,715,652 A | * | 12/1987 | Ward |
| 4,733,908 A | | 3/1988 | Dykstra et al. |
| 4,759,584 A | | 7/1988 | Dykstra et al. |
| 4,799,731 A | * | 1/1989 | Brown |
| 4,818,017 A | | 4/1989 | Dykstra et al. |
| 4,828,211 A | | 5/1989 | McConnell et al. |
| 4,927,200 A | | 5/1990 | Wilkins |
| 4,942,827 A | * | 7/1990 | Norgaard |
| 4,943,111 A | | 7/1990 | VanderLaan |
| 4,951,997 A | * | 8/1990 | Kenney |
| 5,007,610 A | | 4/1991 | Christiansen et al. |
| 5,035,464 A | * | 7/1991 | Spallholtz |
| 5,072,909 A | | 12/1991 | Huang |
| 5,131,716 A | | 7/1992 | Kwasnik et al. |
| 5,150,946 A | | 9/1992 | Marfilius et al. |
| 5,248,183 A | | 9/1993 | Gignac |
| 5,286,084 A | | 2/1994 | Bart |
| 5,289,962 A | | 3/1994 | Tull et al. |
| 5,332,286 A | | 7/1994 | Atherton et al. |
| 5,494,249 A | | 2/1996 | Ozark et al. |
| 5,524,957 A | * | 6/1996 | Gibriano |
| 5,586,806 A | * | 12/1996 | Hergott |
| 5,615,925 A | | 4/1997 | Kain |
| 5,618,018 A | | 4/1997 | Baniak |
| 5,628,486 A | | 5/1997 | Rossman et al. |
| 5,685,604 A | | 11/1997 | Kain |
| 5,746,363 A | | 5/1998 | Teller et al. |
| 5,788,324 A | | 8/1998 | Shea et al. |
| 5,947,554 A | | 9/1999 | Mashkevich |
| 5,964,502 A | | 10/1999 | Stephens |
| 6,019,334 A | | 2/2000 | Shinomiya |
| 6,065,729 A | | 5/2000 | Anderson |
| 6,105,917 A | | 8/2000 | Yabuya et al. |
| 6,142,574 A | | 11/2000 | Alexander |
| 6,220,660 B1 | | 4/2001 | Bedro et al. |
| 6,250,527 B1 | | 6/2001 | Mizue et al. |
| 6,253,975 B1 | | 7/2001 | Ichioka et al. |
| 6,264,273 B1 | | 7/2001 | Waters, Sr. |
| 6,343,837 B1 | * | 2/2002 | Gage |

* cited by examiner

Primary Examiner—Milton Nelson, Jr.
(74) Attorney, Agent, or Firm—Barnes & Thornburg

(57) ABSTRACT

A juvenile vehicle seat is provided including a cup holder. The cup holder is movable between a retracted position adjacent the seat and an extended position spaced from the seat.

47 Claims, 3 Drawing Sheets

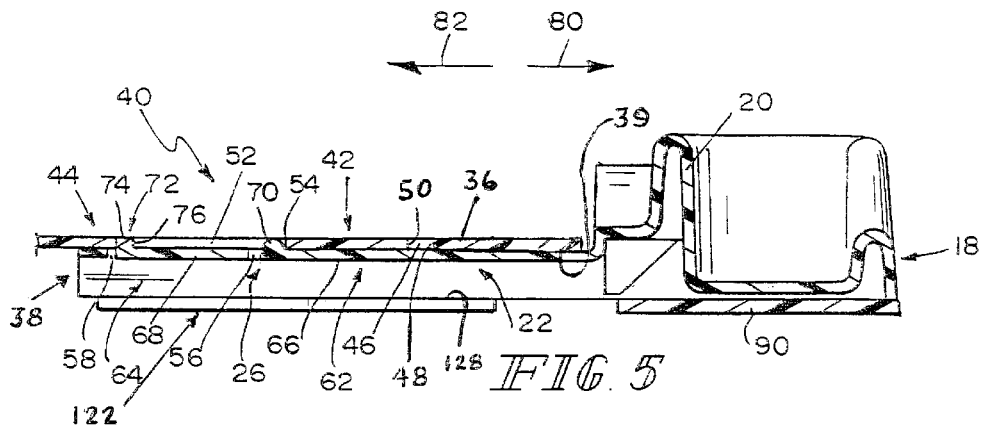
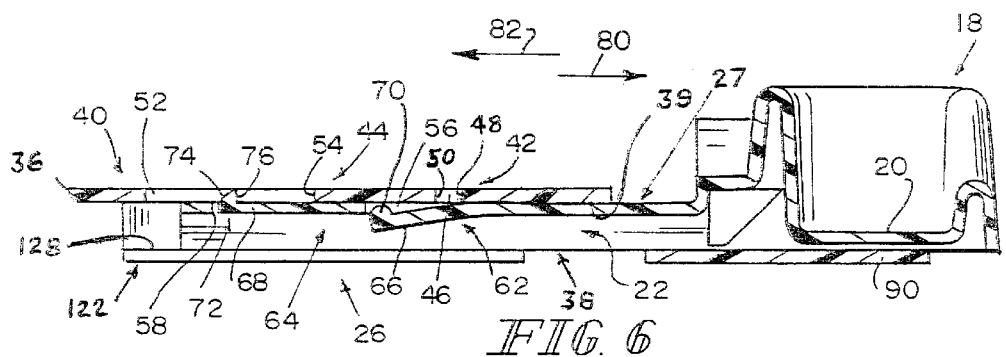
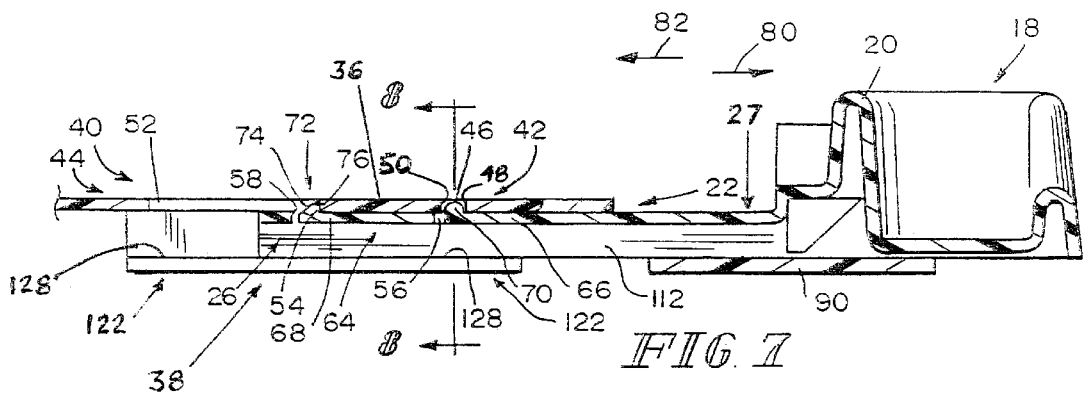
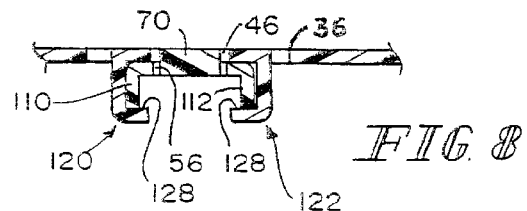

JUVENILE VEHICLE SEAT CUP HOLDER

BACKGROUND AND SUMMARY

The present application relates to a juvenile vehicle seat and particularly to a juvenile vehicle seat having a cup holder movable between a retracted position and an extended position.

Conventional juvenile vehicle seats are generally known and are in relatively widespread use. It is desirable to provide a juvenile vehicle seat including a cup holder movable between a retracted position and an extended position.

According to the present disclosure, a juvenile vehicle seat is provided including a seat bottom and a seat back and a cup holder movable relative to the seat bottom. The cup holder is movable between a retracted position adjacent the seat bottom and an extended position spaced from the seat bottom.

In an illustrative embodiment, the cup holder includes a cup retainer or article receiver coupled to a connector or connecting member. A first portion of the connector cooperates with a second portion of the seat bottom or a base for the seat bottom to inhibit movement of the cup holder from at least one of the retracted and extended positions.

In another illustrative embodiment, the juvenile vehicle seat base is configured to releasably couple to the seat bottom. The base provides a receptor or aperture to receive the connector. The base includes engagement edges that cooperate with the connector to inhibit movement of the cup holder from at least one of the retracted and extended positions.

In another illustrative embodiment, the connector provides surfaces to engage the engagement edges of the base. One or more flexible tabs provide the surfaces so that when a user applies sufficient force to move the cup holder toward the extended position or the retracted position the tabs flex to disengage the surfaces from the edges. The tabs and surfaces thereon are configured to cooperate with the base or seat bottom to inhibit movement of the cup holder until a deliberate and sufficient force is applied to move the cup holder.

In still another illustrative embodiment, while in the retracted position, the cup holder is spaced apart from the seat bottom by a first distance. In the extended position the cup holder is spaced apart from the seat bottom by a second distance. The second distance is greater than the first distance. The second distance is sufficient so that the cup holder, when in the extended position, can accommodate cups or other articles having dimensions that would not be accommodated by the cup holder in the retracted position.

Additional objects, features, and advantages of the present application will become apparent to those of ordinary skill in the art upon consideration of the following detailed description of preferred embodiments exemplifying the best mode of carrying out the subject matter of this application as presently perceived.

BRIEF DESCRIPTION OF THE DRAWINGS

The detailed description particularly refers to the accompanying figures in which:

FIG. 5 is a sectional view of the juvenile vehicle seat of FIG. 1 taken along line 5—5 of FIG. 3 showing the cup holder in a retracted position, showing the connector engaging the base;

FIG. 6 is a sectional view of the juvenile vehicle seat similar to FIG. 5 showing the cup holder in a position between the retracted and extended positions;

FIG. 7 is a sectional view similar to FIG. 5 showing the cup holder in the extended position; and FIG. 8 is a sectional view of a portion of the juvenile vehicle seat of FIG. 1 taken along line 8—8 of FIG. 7.

DETAILED DESCRIPTION OF THE PREFERRED EMBODIMENTS

Figure 1:
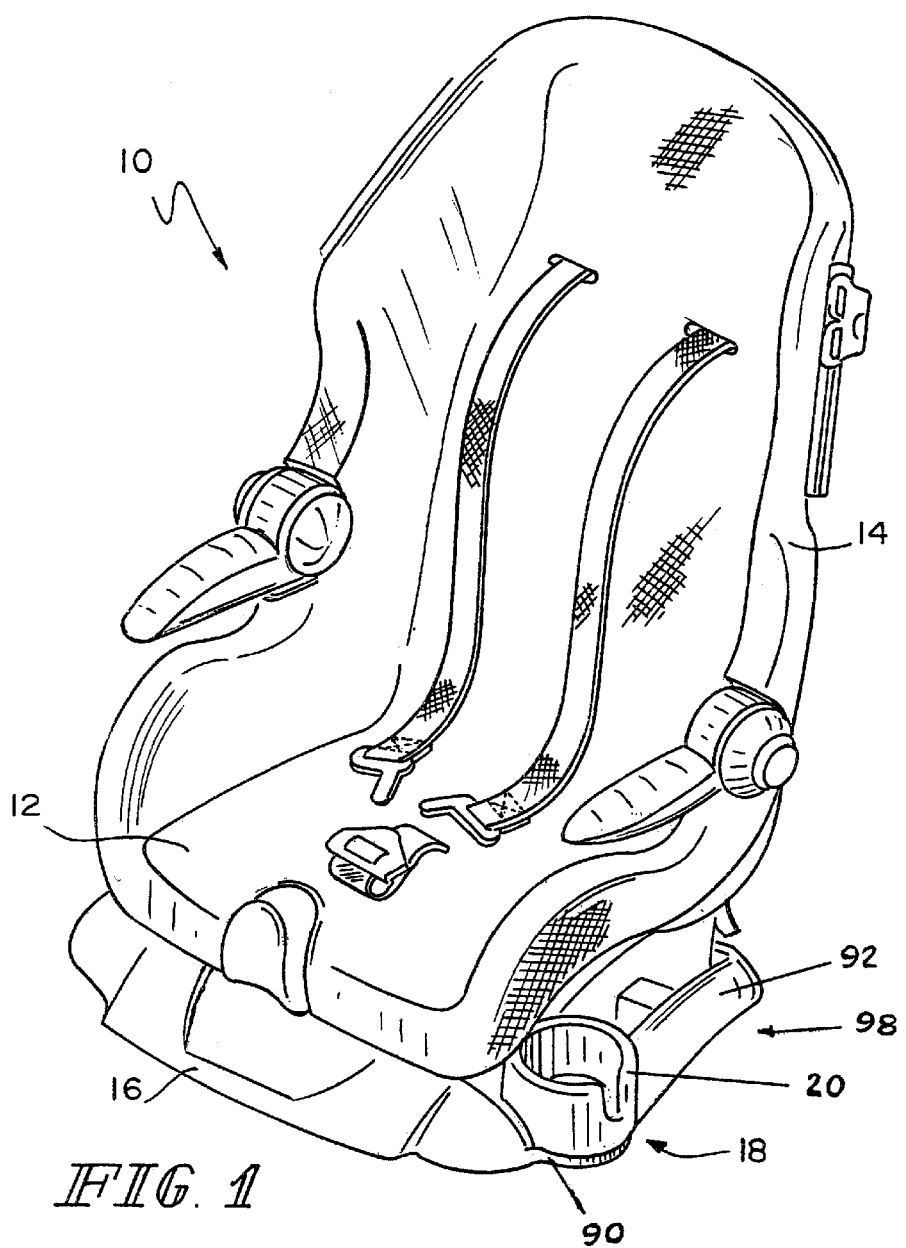
FIG. 1 is a perspective view of a juvenile vehicle seat having a seat back, a seat bottom coupled to the seat back, a base coupled to the seat bottom, and a movable cup holder engaging the base.
Figure 2:
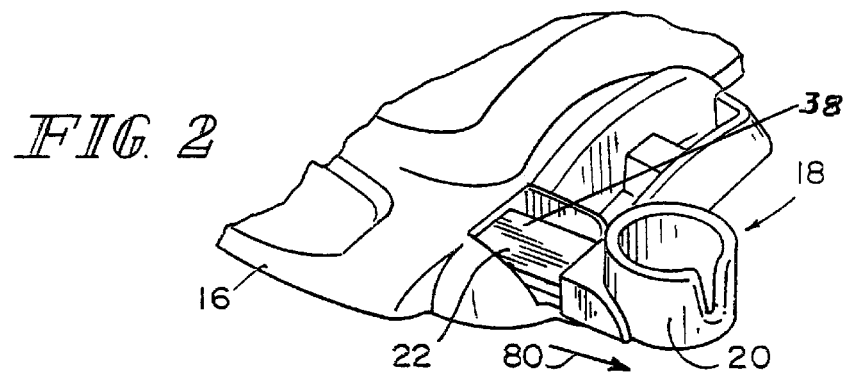
FIG. 2 is a perspective view of a portion of the juvenile vehicle seat of FIG. 1 showing the cup holder in an extended position.
Figure 3:
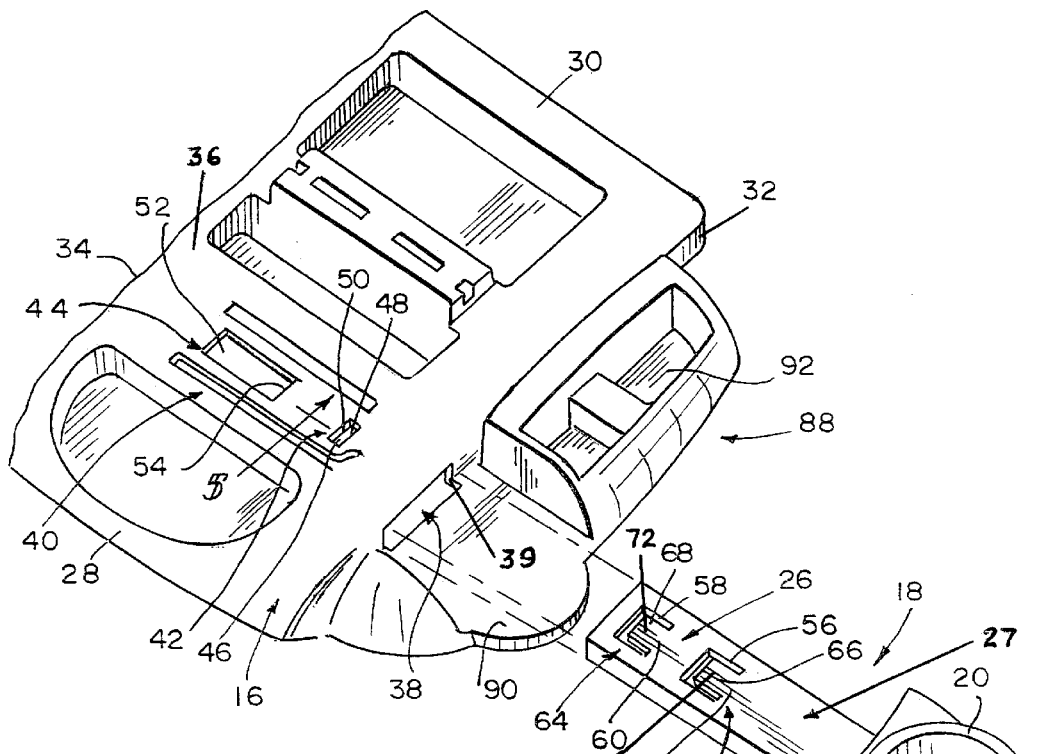
FIG. 3 is a perspective view of a portion of the juvenile vehicle seat of FIG. 1 showing the cup holder positioned for assembly.

Juvenile vehicle seat assembly 10 includes a seat 12, 14, a base 16, and a cupholder 18 as shown in FIG. 1. Base 16 is arranged to support seat 12, 14 and formed to include a cupholder receptor 38 and first, second, and third engagement surfaces 48, 50, 54 as shown in FIGS. 2 and 3. First, second, and third engagement surfaces 48, 50, 54 are arranged to lie in spaced-apart parallel relation to one another as shown in FIG. 3. Second engagement surface 50 is positioned to lie between the first and third engagement surfaces 48, 54 as shown in FIG. 5.

Cupholder 18 is mounted for movement relative to base 16 between a retracted position shown in FIG. 5 and an extended position shown in FIG. 7. Cupholder 18 includes a cup receiver 20 and a base connector 22 coupled to cup receiver 20 and arranged to extend into cupholder receptor 38 formed in base 16 as suggested in FIGS. 1–3. Base connector 22 including a first retainer 62 arranged to confront first and second engagement surfaces 48, 50 upon movement of cupholder 18 to the extended position to inhibit movement of cupholder 18 relative to base 16 and away from the extended position as shown in FIG. 7. First retainer 62 is also arranged to confront third engagement surface 54 upon movement of cupholder 18 to the retracted position to inhibit movement of cupholder 18 relative to base 16 and toward the extended position.

As shown in FIG. 3, base 16 includes a front 28, a rear 30, and a pair of side walls 32, 34. Base 16 further includes means (not shown) for coupling seat bottom 12 to the base. Side wall 32 of base 16 is formed to include an opening 39 into a cupholder receptor 38 formed in base 16 to receive base connector 22 of cup holder 18 and permit sliding movement of base connector 22 relative to base 16. Although certain embodiments are disclosed herein as including base 16, it is within the scope of this disclosure to incorporate the features described herein as being part of base 16 into the seat bottom 12 or other portion of juvenile vehicle seat 10.

Base 16 includes a deck 36 formed to include first, second, and third engagement surfaces 48, 50, 54 and to define a ceiling of cupholder receptor 38 as shown in FIGS. 5–7. Base connector 22 includes a retainer mount portion 26 that is arranged to lie under deck 36 and a neck portion 27 that is arranged to interconnect retainer mount portion 26 and the cup receiver 20 as shown in FIGS. 3 and 6. Retainer means 62, 64 is coupled to base connector 22 for contacting base 16 to inhibit movement of cupholder 18 relative to base 16 between the retracted position and extended position as suggested in FIGS. 5–7. Retainer means 62, 64 includes first retainer 62 and second retainer 64 as shown in FIG. 3.

First retainer 62 is coupled to retainer mount portion 26 as shown in FIG. 3. First retainer 62 is arranged to extend upwardly toward deck 36 to confront first and second engagement surfaces 48, 50 upon movement of cupholder 18 to the extended position and to confront third engagement surface 54 upon movement of cupholder 18 to the retracted position.

Deck 36 is formed to include a first opening 46 defined in part by first and second engagement surfaces 48, 50 and sized to receive therein a portion 70, e.g. a detent, of first retainer 62 upon movement of cupholder 18 to the extended position. Deck 36 is also formed to include a second opening 52 defined in part by third engagement surface 54 and sized to receive therein the detent 70 of the first retainer 62 upon movement of cupholder 18 to the retracted position as shown in FIG. 5. Detent 70 has a curved surface arranged to confront first and second engagement surfaces 48, 50 upon movement of cupholder 18 to the extended position and to confront third engagement surface 54 upon movement of cupholder 18 to the retracted position.

First retainer 62 includes a flexible first tab 66 cantilevered to retainer mount portion 26 of base connector 22 to move up and down relative to deck 36 and detent 70 is appended to flexible first tab 66 to move up and down therewith. Detent 70 is sized to extend into first opening 46 to confront first and second engagement surfaces 48, 50 upon movement of cupholder 18 to the extended position and to extend into second opening 52 to confront third engagement surface 54 upon movement of cupholder 18 to the retracted position. Flexible first tab 66 provides means for moving detent 70 in an upward direction into second opening 52 to confront third engagement surface 54 upon movement of cupholder 18 to the retracted position as suggested in FIGS. 5 and 6.

Base connector 22 further includes a second retainer 64 arranged to confront third engagement surface 54 upon movement of cupholder 18 to the extended position to inhibit further movement of cupholder 18 relative to base 16 away from the retracted position so as to block movement of cupholder 18 to a withdrawn position outside of cupholder receptor 38 formed in base 16. Second retainer 64 is coupled to retainer mount portion 26 to cause first retainer 62 to lie between neck portion 27 and second retainer 64. Second retainer 64 is arranged to extend upwardly toward deck 36 to confront third engagement surface 54 upon movement of cupholder 18 to the extended position as shown in FIG. 7 and to lie in spaced-apart relation to third engagement surface 54 upon movement of cupholder 18 to the retracted position as shown in FIG. 5.

Second retainer 64 includes a flexible second tab 68 cantilevered to retainer mount portion 26 of the base connector 22 to move up and down relative to deck 36 and a catch 72 appended to flexible second tab 68 to move up and down therewith. Catch 72 is sized to extend into the second opening 52 to confront third engagement surface 54 upon movement of cupholder 18 to the extended position.

Catch 72 has a vertical stop surface 76 arranged to contact third engagement surface 54 to inhibit removal of cupholder 18 from cupholder receptor 38 formed in base 16. Catch 72 also includes a sloped surface 74 arranged to cam on second engagement surface 50 to bend flexible second tab 68 downwardly to move catch 72 relative to deck 36 and away from second engagement surface 50 during initial insertion of base connector 22 into cupholder receptor 38 and movement of cupholder 18 relative to base 16 toward the retracted position. Catch 72 is positioned to lie in second opening 52 in spaced-apart relation to third engagement surface 54 upon movement of cupholder 18 to the retracted position.

Base 16 further includes a platform 90 located under a portion of the cupholder 18 and a side wall 32 is located between deck 36 and platform 90. Side wall 32 is formed to include side opening 39 and cooperate with deck 36 to form cupholder receptor 38 under deck 36 to receive base connector 22 through the side opening 39 as suggested in FIG. 3. Cupholder 18 is arranged to move along a path above platform 90 during movement of cupholder 18 between the retracted and extended positions as shown in FIGS. 5–7.

Base 16 further includes left and right guide supports 120, 122 located in cupholder receptor 38 under deck 36 and arranged to support a portion of cupholder 18 for sliding movement relative to base 16 during movement of cupholder 18 between the retracted and extended positions. Platform 90 is arranged to lie outside of cupholder receptor 38 formed in base 16 to support another portion of cupholder 18 for sliding movement relative to base 16 during movement of cupholder 18 between the retracted and extended positions.

Referring now to FIGS. 4–7, first portion 26 of base connector 22 is configured to cooperate with a second portion 40 of base 16. Second portion 40 includes first and second retainer engaging portions 42, 44 for engaging base connector 22. Illustratively, first retainer engaging portion 42 provides a first opening or notch 46 providing engagement edges or surfaces 48, 50 that cooperate with base connector 22 to inhibit movement of cup holder 18 from the extended position. Second retainer engaging portion 44 provides a second opening 52 providing a third engagement edge or surface 54 to cooperate with base connector 22 to inhibit movement of cup holder 18 from the retracted position and to inhibit removal of cup holder 18 from base 16. Although in illustrative embodiments base 16 includes first and second retainer engaging portions 42, 44, a single retainer engaging portion inhibiting movement of the cup holder 18 is within the scope of this disclosure. Additionally, although retainer engaging portions 42, 44 have been illustrated as including first and second openings 46, 52 providing engagement edges 48, 50, 54, other known structures cooperating with base connector 22 to inhibit movement of cup holder 18 are within the scope of this disclosure. For example, cup holder 18 could include a structure to interact with the seat bottom or base to provide friction or other forms of contact to inhibit movement of the cup holder.

As shown in FIG. 3, base connector 22 provides first and second openings 56, 58 each providing a connection edge 60. First portion 26 of base connector 22 includes first and second retainers 62, 64 having first and second tabs 66, 68 respectively, each tab being cantilevered to one of connection edges 60. As shown in FIGS. 5–7, first tab 66 provides a detent 70. Illustratively, detent 70 has a curved surface. Also as shown in FIGS. 5–7, second tab 68 provides a catch 72 having a sloped surface 74 and a stop surface 76.

Figure 4:
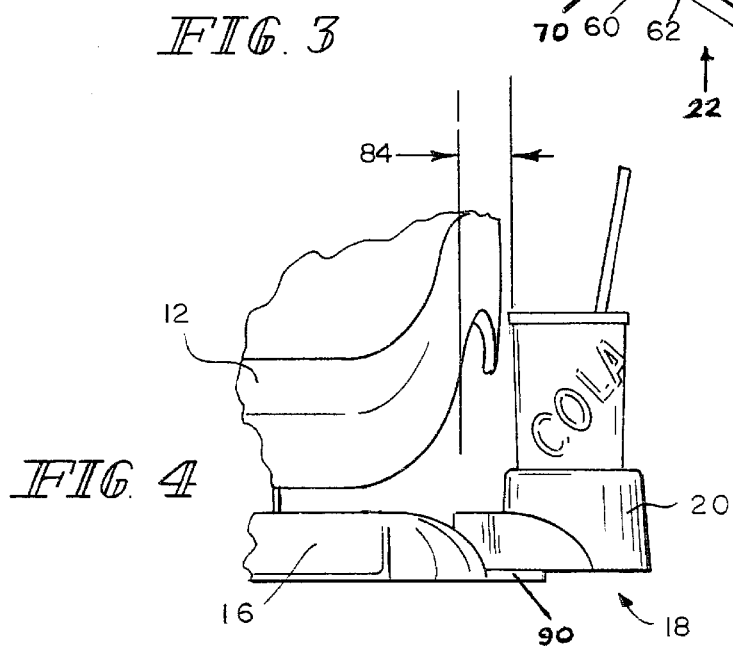
FIG. 4 is a front view of a portion of the juvenile vehicle seat of FIG. 1 showing the cup holder in the extended position.

As shown in FIG. 4, when cup holder 18 is in the extended position, cup receiver 20 is spaced apart from base 16 and seat bottom 12 by a distance 84 greater than when cup holder 18 is in the retracted position. In an illustrative embodiment, distance 84 is about two inches. However, it is within the scope of this disclosure for distance 84 to be other lengths. Distance 84 is illustratively sufficient in length so that cup receiver 20, when in the extended position, can accommodate cups or other articles having dimensions that would not be accommodated by the cup holder 18 in the retracted position.

In the retracted position shown in FIG. 5, cup receiver 20 is proximate or adjacent side 32 of base 16. In this position, catch 72 and detent 70 are positioned in second opening 52. When a user applies force to cup holder 18 in a direction 80, detent 70 engages third engagement edge 54 of opening 52 to inhibit movement of cup holder 18 from the retracted position toward the extended position.

Referring to FIG. 6, as a user applies a force sufficient to move cup holder 18 in direction 80 from the retracted position toward the extended position, the curved surface of detent 70 moves against third engagement edge 54 until first tab 66 flexes and detent 70 disengages third engagement edge 54. As a user continues to slide cup holder 18 in direction 80, detent 70 moves against a bottom surface of second retainer engaging portion 44.

As a user moves cup holder 18 to the extended position shown in FIG. 7, detent 70 snaps into first opening or notch 46. In this position, detent 70 is adjacent edges 48, 50 of first opening 46. Also as shown in the extended position of FIG. 7, catch 72 is adjacent third engagement edge 54 of second opening 52. When cup holder 18 is in the extended position, as a user applies force in direction 80 to cup holder 18, detent 70 and stop surface 76 engage edge 48 and third engagement edge 54 respectively, inhibiting removal of cup holder 18 from base 16. As a user applies force in direction 82 to cup holder 18, detent 70 engages edge 50, inhibiting movement of cup holder 18 from the extended position toward the retracted position.

To insert cup holder 18 into base 16, a user inserts base connector 22 into cupholder receptor 38. As the user moves cup holder 18 toward the retracted position, catch 72 slides along an underside of base 16. Sloped surface 74 facilitates insertion of base connector 22 by the user by reducing resistance in sliding catch 72 past edge 50.

Each of guide supports 120, 122 includes a generally upwardly facing support surface 128. In operation, as shown in FIGS. 5–7, guides 110, 112 slide on support surface 128 thereby maintaining first portion 26 of cup holder 18 in the proper position to engage second portion 40 of base 16.

As shown in FIGS. 5–7, platform 90 illustratively provides additional support to cup holder 18 by supporting cup receiver 20 when cup holder 18 is in the retracted position, and by supporting at least a portion of cup receiver 20 or base connector 22 when cup holder 18 is between the retracted and extended positions. When cup holder 18 is in the extended position, platform 90 supports base connector 22. Platform 90 and container 92 are illustratively shaped so that the outer surface contours of cup holder 18 appear to continue the contours of the outer surfaces of platform 90 and container 92. These shapes provide the appearance that the cup holder 18 is an integral part of the base 16 when the cup holder 18 is in the retracted position.

Although this application has described detail with reference to certain preferred or illustrative embodiments, variations and modifications exist within the scope and spirit of the invention as described and defined in the following claims.

What is claimed is:

1. A juvenile vehicle seat assembly comprising
   a seat, and
   a cup holder movably secured to the seat, the cup holder being positionable between a first position and a second position,
   wherein the cup holder is spaced apart from the seat by a first distance when the cup holder is in the first position and is spaced apart from the seat by a second distance when the cup holder is in the second position, the first distance being less than the second distance, and
   wherein the assembly further comprises a base, the seat being removably secured to the base, and the cup holder is movably secured to the base.

2. The juvenile vehicle seat assembly of claim 1, wherein the cup holder includes a connecting member, the connecting member being movable relative to the base, and a cup receiver coupled to the connecting member to move therewith.

3. The juvenile vehicle seat assembly of claim 2 further comprising a detent carried on one of the base or the connecting member and a notch provided in the other of the base or the connecting member to inhibit movement of the cup holder from at least one of the first or second positions.

4. The juvenile vehicle seat assembly of claim 2, wherein the base provides a receptor for the connecting member.

5. The juvenile vehicle seat assembly of claim 2, wherein the connecting member includes a detent, the base includes a notch, and the detent engages the notch to inhibit movement of the cup holder from the second position toward the first position.

6. The juvenile vehicle seat assembly of claim 5, wherein the base further includes an opening and the detent engages an edge of the opening to inhibit movement of the cup holder from the first position toward the second position.

7. The juvenile vehicle seat assembly of claim 6, wherein the connecting member further includes a catch that engages the edge of the opening to inhibit removal of the cup holder from the base.

8. The assembly of claim 1, wherein the base is formed to include an aperture defined therein, and the cup holder includes a base connector, the base connector extending into the aperture.

9. The assembly of claim 8, wherein the base connector includes a first portion and the base includes a second portion, the first portion cooperating with the second portion to inhibit movement of the cup holder from at least one of the first or second positions.

10. The assembly of claim 9, wherein the first portion includes a detent and the second portion provides an engagement edge, the detent engaging the edge when the cup holder is in the first position to inhibit movement of the cup holder from the first position toward the second position.

11. The assembly of claim 10, wherein the first portion further includes a catch that engages the edge when the cup holder is in the second position to inhibit removal of the cup holder from the base.

12. The assembly of claim 10, wherein the second portion includes a notch and the detent engages the notch when the cup holder is in the second position to inhibit removal of the cup holder from the base and to inhibit movement of the cup holder from the second position toward the first position.

13. The juvenile vehicle seat assembly of claim 1, wherein a base connector includes a retainer and the base includes a first retainer engaging portion and a second retainer engaging portion, wherein the retainer engages the first retainer engaging portion to inhibit movement of the cup holder from the second position and the retainer engages the second retainer engaging portion to inhibit movement of the cup holder from the first position.

14. The juvenile vehicle seat assembly of claim 1, wherein a base connector includes a first retainer and a second retainer and the base includes a retainer engaging portion, wherein the first retainer engages the retainer engaging portion to inhibit movement of the cup holder from the first position and the second retainer engages the retainer engaging portion to inhibit movement of the cup holder from the base.

15. A juvenile vehicle seat assembly comprising
a seat,
a base arranged to support the seat and form ed to include a cupholder receptor and to include first, second, and third engagement surfaces, and
a cupholder mounted for movement relative to the base between a retracted position and an extended position, the cupholder including a cup receiver and a base connector coupled to the cup receiver and arranged to extend into the cupholder receptor formed in the base, the base connector including a first retainer arranged to confront the first and second engagement surfaces upon movement of the cupholder to the extended position to inhibit movement of the cupholder relative to the base and away from the extended position and arranged to confront the third engagement surface upon movement of the cupholder to the retracted position to inhibit movement of the cupholder relative to the base and toward the extended position.

16. The seat assembly of claim 15, wherein the first, second, and third engagement surfaces are arranged to lie in spaced-apart parallel relation to one another.

17. The seat assembly of claim 16, wherein the second engagement surface is positioned to lie between the first and third engagement surfaces.

18. The seat assembly of claim 16, wherein the first and second engagement surfaces cooperate to define an opening therebetween and a portion of the first retainer extends into the opening upon movement of the cupholder to the extended position.

19. The seat assembly of claim 15, wherein the base includes a deck formed to include the first, second, and third engagement surfaces and to define a ceiling of the cupholder receptor, the base connector includes a retainer mount portion that is arranged to lie under the deck and a neck portion that is arranged to interconnect the retainer mount portion and the cup receiver, and the first retainer is coupled to the retainer mount portion and arranged to extend upwardly toward the deck to confront the first and second engagement surfaces upon movement of the cupholder to the extended position and to confront the third engagement surface upon movement of the cupholder to thee retracted position.

20. The seat assembly of claim 19, wherein the deck is formed to include a first opening defined in part by the first and second engagement surfaces and sized to receive therein a portion of the first retainer upon movement of the cupholder to the extended position and the deck is also formed to include a second opening defined in part by the third engagement surface and sized to receive therein a portion of the first retainer upon movement of the cupholder to the retracted position.

21. The seat assembly of claim 20, wherein the portion of the first retainer is a detent having a curved surface arranged to confront the first and second engagement surfaces upon movement of the cupholder to the extended position and to confront the third engagement surface upon movement of the cupholder to the retracted position.

22. The seat assembly of claim 19, wherein the deck is formed to include a first opening defined in part by the first and second engagement surfaces and a second opening defined in part by the third engagement surface, the first retainer includes a flexible first tab cantilevered to the retainer mount portion of the base connector to move up and down relative to the deck and a detent appended to the flexible first tab to move up and down therewith, and the detent is sized to extend into the first opening to confront the first and second engagement surfaces upon movement of the cupholder to the extended position and to extend into the second opening to confront the third engagement surface upon movement of the cupholder to the retracted position.

23. The seat assembly of claim 22, wherein the detent has a curved surface arranged to contact the second engagement surface upon movement of the cupholder from the extended position toward the retracted position to urge the flexible first tab in a downward direction away from the deck to allow the detent to leave the first opening and upon further movement of the cupholder relative to the deck to reach the retracted position and wherein the flexible first tab provides means for moving the detent in an upward direction into the second opening to confront the third engagement surface upon movement of the cupholder to the retracted position.

24. The seat assembly of claim 19, wherein the base connector further includes a second retainer arranged to confront the third engagement surface upon movement of the cupholder to the extended position to inhibit further movement of the cupholder relative to the base away from the retracted position, the second retainer is coupled to the retainer mount portion to cause the first retainer to lie between the neck portion and the second retainer, and the second retainer is arranged to extend upwardly toward the deck to confront the third engagement surface upon movement of the cupholder to the extended position and to lie in spaced-apart relation to the third engagement surface upon movement of the cupholder to the retracted position.

25. The seat assembly of claim 19, wherein the base connector further includes a second retainer arranged to confront the third engagement surface upon movement of the cupholder to the extended position to inhibit further movement of the cupholder relative to the base away from the retracted position, the deck is formed to include an opening defined in part by the third engagement surface, and the second retainer includes a flexible tab cantilevered to the retainer mount portion of the base connector to move up and down relative to the deck and a catch appended to the flexible tab to move up and down therewith and sized to extend into the opening to confront the third engagement surface upon movement of the cupholder to the extended position.

26. The seat assembly of claim 25, wherein the catch has a stop surface arranged to contact the third engagement surface to inhibit removal of the cupholder from the cupholder receptor formed in the base.

27. The assembly seat of claim 26, wherein the catch is positioned to lie in the opening in spaced-apart relation to the third engagement surface upon movement of the cupholder to the retracted position, the first retainer includes a flexible tab cantilevered to the retainer mount portion of the base connector to move up and down relative to the deck and a detent appended to the flexible tab of the first retainer to move up and down therewith, and the detent is sized to extend into the opening formed in the deck to confront the third engagement surface and lie in the opening between the catch and the third engagement surface upon movement of the cupholder to thy retracted position.

28. The seat assembly of claim 25, wherein the catch has a vertical stop surface arranged to contact the third engagement surface to inhibit removal of the cupholder from the cupholder receptor formed in the base and a sloped surface arranged to cam on the second engagement surface to bend the flexible tab downwardly to move the catch relative to the deck and away from the second engagement surface during initial insertion of the base connector into the cupholder receptor and movement of the cupholder relative to the base toward the retracted position.

29. The seat assembly of claim 15, wherein the base connector further includes a second retainer arranged to confront the third engagement surface upon movement of the cupholder to the extended position to inhibit further movement of the cupholder relative to the base away from the retracted position.

30. The seat assembly of claim 29, wherein the first retainer includes a flexible first tab and a detent carried on the flexible first tab and the second retainer includes a flexible second tab and a catch carried on the flexible second tab.

31. The seat assembly of claim 30, wherein the detent has a curved surface arranged to contact the second engagement surface upon movement of the cupholder from the extended position toward the retracted position to urge the flexible first tab in a downward direction away from the second engagement surface to allow the detent to move under and past the second engagement surface upon further movement of the cupholder to reach the retracted position.

32. The seat assembly of claim 30, wherein the catch has a vertical stop surface arranged to contact the third engagement surface to inhibit removal of the cupholder from the cupholder receptor formed in the base and a sloped surface arranged to cam on the second engagement surface to bend the flexible second tab downwardly to move the catch under and past the second engagement surface during initial insertion of the base connector into the cupholder receptor and movement of the cupholder relative to the base toward the retracted position.

33. A juvenile vehicle seat assembly comprising
a base including a deck formed to include first and second openings, and a side wall formed to include a side opening, the deck and side wall cooperating to form a cupholder receptor located under the deck to receive a portion of a cupholder through the side opening formed in the side wall,
a seat supported on the base, and
a cupholder arranged to extend into the cupholder receptor through the side opening formed in the side wall and move relative to the base between an extended position and a retracted position, the cupholder including a first retainer arranged to extend into the first opening formed in the deck to inhibit movement of the cupholder relative to the base upon movement of the cupholder to the extended position and to extend into the second opening formed in the deck to inhibit movement of the cupholder relative to the base upon movement of the cupholder to the retracted position, the cupholder further including a second retainer arranged to extend into the second opening formed in the deck to inhibit movement of the cupholder from the extended position to a withdrawn position outside of the cupholder receptor formed in the base upon movement of the cupholder to the extended position.

34. The seat assembly of claim 33, wherein the base further includes a platform located under a portion of the cupholder, the side wall is located between the deck and the platform, and the cupholder is arranged to move along a path above the platform during movement of the cupholder between the retracted and extended positions.

35. The seat assembly of claim 34, wherein the base further includes left and right guide supports located in the cupholder receptor under the deck and arranged to support a portion of the cupholder for sliding movement relative to the base during movement of the cupholder between the retracted and extended positions, the first and second retainers are coupled to said portion of the cupholder, and the platform is arranged to lie outside of the cupholder receptor formed in the base to support another portion of the cupholder for sliding movement relative to the base during movement of the cupholder between the retracted and extended positions.

36. The seat assembly of claim 33, wherein the base further includes left and right guide supports located in the cupholder receptor under the deck and arranged to support a portion of the cupholder for sliding movement relative to the base during movement of the cupholder between the retracted and extended positions.

37. The seat assembly of claim 33, wherein the cupholder includes a cup receiver and a base connector coupled to the cup receiver and arranged to extend into the cupholder receptor formed in the base and the first and second retainers are coupled to the base connector.

38. The seat assembly of claim 37, wherein the first retainer includes a flexible first tab cantilevered to the base connector and a detent carried on the flexible first tab and sized to extend into the first opening formed in the deck upon movement of the cupholder to the extended position to inhibit movement of the cupholder relative to the base and to extend into the second opening formed in the deck upon movement of the cupholder to the retracted position to inhibit movement of the cupholder from the retracted position to the extended position.

39. The seat assembly of claim 38, wherein the second retainer includes a flexible second tab cantilevered to the base connector and a catch carried on the flexible second tab and sized to extend into the second opening formed in the deck upon movement of the cupholder to the extended position to inhibit withdrawal of the base connector from the cupholder receptor formed in the base through the side opening formed in the side wall.

40. The seat assembly of claim 37, wherein the second retainer includes a flexible second tab cantilevered to the base connector and a catch carried on the flexible second tab and sized to extend into the second opening formed in the deck upon movement of the cupholder to the extended position to inhibit withdrawal of the base connector from the cupholder receptor formed in the base through the side opening formed in the side wall.

41. A juvenile vehicle seat assembly comprising
a base formed to include a cupholder receptor,
a seat supported on the base to lie above the cupholder receptor, and
a cupholder mounted for movement in the cupholder receptor formed in the base between a retracted position and an extended position, the cupholder including a base connector arranged to extend into and move in the cupholder receptor formed in the base, a cup receiver adapted to receive a cup therein and located to position a portion of the cup receiver under the seat upon movement of the cupholder to the retracted position and to position the cup receiver away from the seat upon movement of the cupholder to the extended position, and retainer means coupled to the base connector for contacting the base to inhibit movement of the cupholder relative to the base between the retracted position and the extended position.

42. The seat assembly of claims 41, wherein the base includes a deck, and a side wall formed to include a side opening and cooperate with the deck to form the cupholder receptor under the deck to receive the base connector through the side opening formed in the side wall.

43. The seat assembly of claim 42, wherein the base includes a platform positioned relative to the deck to locate the side wall therebetween and positioned to underlie a portion of the cup receiver upon movement of the cupholder to each of the retracted and extended positions.

44. The seat assembly of claim 43, wherein the base further includes a container coupled to each of the side wall and the platform.

45. The seat assembly of claim 43, wherein the base further includes a guide support located in the cupholder receptor under the deck and arranged to support the base connector for sliding movement relative to the base during movement of the cupholder between the retracted and extended positions and movement of the cup receiver on the platform.

46. The seat assembly of claim 41, wherein the deck is formed to include first and second openings located under the seat and the retainer means includes a first retainer coupled to the base connector and arranged to extend into the first opening formed in the deck to inhibit movement of the cupholder relative to the base upon movement of the cupholder to the extended position and to extend into the second opening formed in the deck to inhibit movement of the cupholder toward the extended position upon movement of the cupholder to the retracted position.

47. The seat assembly of claim 46, wherein the retainer means further includes a second retainer coupled to the base connector and arranged to extend into the second opening formed in the deck to inhibit movement of the cupholder from the extended position to a withdrawn position outside of the cupholder receptor formed in the base upon movement of the cupholder to the extended position.

* * * * *